3,454,603
METHOD OF PREPARING 1,4-3,6-DIANHYDROIDITOL AND 1,4-3,6-DIANHYDROGLUCITOL
Ludwig A. Hartmann, Wilmington, Del., assignor to Atlas Chemical Industries, Inc., Wilmington, Del., a corporation of Delaware
No Drawing. Continuation-in-part of application Ser. No. 470,217, July 7, 1965. This application May 18, 1966, Ser. No. 550,937
Int. Cl. C07d 5/20
U.S. Cl. 260—347.8                                11 Claims

ABSTRACT OF THE DISCLOSURE

A process of preparing dianhydrohexitols which comprises heating a polyol selected from the group of dulcitol, allitol, talitol, and their 1,4-monoanhydrides in the presence of an acid catalyst until anhydrized. Talitol is anhydrized to 1,4-3,6-dianhydroiditol. Dulcitol and allitol are anhydrized to 1,4-3,6-dianhydroglucitol.

---

This application is a continuation-in-part of a co-pending application, Ser. No. 470,217 filed July 7, 1965 now abandoned.

This invention relates to a novel method of preparing 1,4-3,6-dianhydroiditol and 1,4-3,6-dianhydroglucitol.

It is known that hexitols such as D-sorbitol, D-mannitol and L-iditol on dianhydrization yield D-isosorbide, D-isomannide and L-isoidide respectively, because the configuration of the hydroxyl groups favors normal ring closure between carbon atoms $C_1$ and $C_4$, as well as $C_3$ and $C_6$. Such favorable configurations do not exist in the case of dulcital, allitol and talitol. Their molecular configurations allow only the introduction of one anhydro ring to yield the corresponding 1,4-monoanhydro compounds, while the dianhydrization products are not known due to unfavorable molecular geometry and strain which would be introduced by a second ring system.

The present invention is based on the discovery that certain polyols, specifically talitol, allitol and dulcitol or their 1,4-monoanhydrides can be anhydrized in the presence of an acid catalyst to yield unexpected dianhydrides, as their six-carbon skeletons are altered from their usual configurations. It has been discovered, that the dianhydro product 1,4-3,6-dianhydro-D,L-idital can be obtained from D,L-talitol. In a like manner 1,4-3,6-dianhydro-D-iditol and 1,4-3,6-dianhydro-L-iditol can be obtained from D-talitol and L-talitol respectively under the conditions of the present invention. Similarly dulcitol, and allitol, under the conditions of the present invention yield 1,4-3,6-dianhydro-D,L-glucitol. No similar cases of transformation of the hexitol skeleton under conditions of ring closure between carbons one-four and three-six has previously been observed.

The products of this invention are useful as intermediates in the preparation of various other products. For example, 1,4-3,6-dianhydroiditol and 1,4-3,6-dianhydroglucitol are useful as intermediates in the preparation of surface active agents prepared by esterification of the subject compounds with fatty acids or fatty esters. Illustratively, one mole of 1,4-3,6-dianhydro-D,L-iditol or 1,4-3,6-dianhydro-D,L-glucitol may be reacted with one mole of a fatty acid such as stearic acid in the presence of a catalytic quantity of p-toluene sulfonic acid such as 0.05% at approximately 200° C. in an inert atmosphere for about four hours to produce a surface active agent. Additionally, these hexides may be used as intermediates for the preparation of nitration products which are useful vasodilators. Nitration products of the subject dianhydrohexitols of this invention are readily obtainable by treating the dianhydrohexitols with a mixture of sulfuric and nitric acid, as in the well-known process for making glycerol trinitrate.

The starting material for the preparation of 1,4-3,6-dianhydro-D,L-iditol in accordance with this invention is D,L-talitol or its 1,4-monoanhydride. Similarly, D- or L-talitol or their 1,4-monoanhydrides can be used as the starting materials in the present method to prepare 1,4-3,6-dianhydro-D-iditol and 1,4-3,6-dianhydro-L-iditol respectively.

D,L-talitol may be obtained by subjecting dulcitol to a catalytic isomerization process as described by Wright and Hartmann (Journal Organic Chemistry 26, 1588, 1961) which results in the production of a mixed product containing a relatively high percentage of D,L-talitol in admixture with some unchanged dulcitol, D,L-sorbital, allitol and D,L-mannitol. This mixed product may then be anhydrized under specified conditions to yield a mixture of anhydrized products including 1,4-3,6-dianhydro-D,L-glucitol and 1,4-3,6-dianhydro-D,L-iditol. Alternately, the mixed isomerized product may be fractionally crystallized to obtain pure D,L-talitol. The D,L-talitol may then be anhydrized by heating in the presence of a suitable catalyst to form 1,4-3,6-dianhydro-D,L-iditol.

In the preparation of 1,4-3,6-dianhydro-D,L-glucitol either allitol, dulcitol or the monoanhydrides, 1,4-D,L-allitan and 1,4-D,L-dulcitan may be used as the starting material. Similarly 1,4-D-dulcitan or 1,4-D-allitan and 1,4-L-dulcitan or 1,4-L-allitan can be anhydrized according to the present method to form 1,4-3,6-dianhydro-D-glucitol and 1,4-3,6-dianhydro-L-glucitol respectively. As the result of the acid catalyzed anhydrization of these products relatively good yields of 1,4-3,6-dianhydro-glucitol are obtained.

To prepare the products of this invention, one of the above listed hexitols or monoanhydrohexitols is mixed with a catalytic quantity of an acid and heated until approximately 2 moles or one mole respectively of water have been split off. The reaction mixture is then neutralized and the anhydro products recovered.

Any known acidic dehydration catalyst, such as sulfuric acid, p-toluene sulfonic acid and the like may be employed. As little as 0.05% by weight of acid exerts a catalytic effect although in the interest of shortening the reaction time it is preferred to employ upwards from 0.1%. Excessive amounts of acid, i.e., greater than about 5%, are avoided to minimize the occurrence of undesired side reactions.

The temperature at which the anhydrization is generally conducted may range from about 110° C. to about 185° C.; however, any reaction temperature sufficient to effect the desired anhydrization may be used. A preferred temperature range is from about 125° C. to about 175° C.

Although the dehydration may be conducted at atmospheric pressure, removal of water of reaction is facilitated by working under reduced pressure. If vacuum is employed the pressure may suitably range from 0.03 mm. to 100 mm. of mercury.

At extremely low pressures (below 1.0 mm.) the subject dianhydrohexitols distill from the reaction mixture as they are formed and are recovered from the distillate. Otherwise, the reaction mixture is neutralized by adding the calculated amount of an alkaline material and the dianhydrohexitols recovered by distillation. The reaction mixture may be distilled directly under high vacuum or first acetylated to convert the alcohols to lower boiling esters to facilitate the distillation. The free alcohols are regenerated from the distilled esters in known manner.

The products may be further purified by redistillation or by recrystallization from methyl ethyl ketone or ethyl acetate. The 1,4-3,6-dianhydro-D,L-glucitol is of such a nature that it is not readily crystallized, thus crystallization is not used as a method to purify 1,4-3,6-dianhydro-D,L-glucitol.

The data set forth in the following examples is presented to enable a clear understanding of the subject invention. However, it will be understood that the said examples are given by way of illustration and are not to be considered limitative of the scope of the present invention.

EXAMPLE 1

A 20 gram sample of D,L-talitol containing some D,L-sorbitol as obtained from the catalytic isomerization of dulcitol and separated as described by Wright and Hartmann (Journal Organic Chemistry 26, 1588, 1961) was charged to a semimicro flask equipped with a thermometer and capillary which was attached to a condenser via a simple stillhead and the sample heated to 100° C. at which temperature it melted. A receiver and Dry Ice trap were attached. Then, 0.2 gram of p-toluenesulfonic acid was added and vacuum applied. The charge was gradually heated to about 140° C. at 150 mm. Hg pressure under which conditions the evolution of water became measurable. The reaction was continued for two hours at 140° C. to 150° C. while the pressure was gradually reduced to about 35 mm. Hg. The charge was then neutralized with 47 mg. calcium hydroxide. There was a yield of 16.7 grams product having a hydroxyl number of 1008.

Quantitative gas-liquid chromatography analysis of this product showed that it consisted of 8.35% of dianhydroglucitol and 29.8% dianhydroiditol.

A sample of 12.5 gm. of the above anhydrization product was distilled using a short still-head and a free flame for heating. Two fractions were collected at the following temperatures and pressure.

(1) B.P. 150–158°/0.2 mm. Hg
(2) B.P. 158–168°/0.2 mm. Hg

Identification of 1,4-3,6-dianhydro-D,L-iditol

A 0.5 gram sample of distillation cut (2) above, was benzoylated with 0.94 gram of benzoyl chloride in 1.8 ml. pyridine on a steam bath for one hour and at room temperature for three days. The product received as the result of the benzoylation process solidified on pouring over crushed ice. This product was recrystallized two times from methanol to yield pure dibenzoate, M.P. 122–124° C. The infrared spectrum in KBr of this compound was found to differ from a sample of the known L-enantiomorph prepared for comparison purposes. However, the solution spectrum of this product is identical with that of the L-isomer. This compound is optically inactive. The compound is thus identified as the dibenzoate of 1,4-3,6-dianhydro-D,L-iditol.

Additionally, distillation cuts (1) and (2) above were combined and redistilled in order to achieve better fractionation. The fraction distilling at 158–160° C./0.15 mm. Hg was found to be 85% dianhydroiditol by gas-liquid chromatography. The refractive index of this product was $n_D^{20}$: 1.50269. The infrared solution spectrum indicated that the product was dianhydroiditol. Two crystallizations of this product from methyl ethyl ketone yielded a solid compound, M.P. 84–85° C. This compound was optically inactive: $[\alpha]_D^{19.7°}$: 0.0° (EtOH, c. 1.29).

EXAMPLE 2

A mixture of D,L-talitol (39.5%) and D,L-sorbitol (59.0%) with allitol and iditol contents below 1%, produced by the partial separation of a catalytic isomerization product of dulcitol, was anhydrized as in Example 1, using a sample weighing 49.3 grams. However, this time the anhydrization was carried out for one hour at 130–160° C./35 mm. Hg and then for 30 minutes at 160–170° C./35 mm. Hg. The degree of anhydrization was determined to be 1.88 moles of water removed per mole of hexitol. A product weighing 37.6 grams was obtained having a hydroxyl number of 848.

The product from this anhydrization was distilled once without fractionation producing a 52.3% yield and redistilled once. The following fractions were obtained.

| Cut | B.P. | $n_D^{20}$ |
|---|---|---|
| 1 | 117–121° C./0.1 mm. Hg | |
| 2 | 120.5–123° C./0.1 mm. Hg | 1.50469 |
| 3 | 123.5–125° C./0.1 mm. Hg | 1.50460 |
| 4 | 130–149° C./0.1 mm. Hg | 1.50365 |

By means of gas-liquid chromatography cuts (2) and (3) above were identified as high purity dianhydroglucitol. By similar means cut (4) was found to be about 56% dianhydroiditol.

Then cuts (2) and (4) were redistilled. Cut (2) was separated into two colorless fractions possessing a boiling point of 122–125° C. with $n_D^{20}$: 1.50441 and 1.50465. Neither of these cut (2) fractions could be crystallized from methyl ethyl ketone or ethyl acetate.

The major portion of cut (4) was redistilled at 145–153° C./0.15 mm. Hg. On recrystallization from methyl ethyl ketone crystalline 1,4-3,6-dianhydro-D,L-iditol, M.P. 84–85° C. was obtained.

EXAMPLE 3

A sample of D-talitol is charged into a flask and treated under the anhydrization conditions set forth in Example 1. 1,4-3,6-dianhydro-D-iditol is obtained as the product.

EXAMPLE 4

A sample of L-talitol is anhydrized by the method of claim 1 and 1,4-3,6-dianhydro-L-iditol is obtained as the product.

EXAMPLE 5

20 grams recrystallized dulcitol was mixed with 0.2 g. p-toluenesulfonic acid and reacted at 170–180° C./65 mm. Hg for 90 minutes. It was determined that 2.34 moles of water were removed per mole of dulcitol. The product was then distilled and by gas-liquid chromatography the product was identified as dianhydroglucitol. 0.5 gram of this product was benzoylated using 0.94 gram benzoyl chloride in 1.8 ml. pyridine for two hours on a steam bath and 24 hours at room temperature. The benzoylated product crystallized immediately upon pouring on crushed ice producing a yield of 0.91 gram. An analytically pure sample of the dibenzoate was obtained after two recrystallizations from methanol, M.P. 126.5–127° C.

The compound was identified as 1,4-3,6-dianhydro-D,L-glucitol dibenzoate by infrared spectroscopy. The crystalline spectrum of the product differed from that of the known D-isomer prepared for comparison purposes. The solution spectra of both the known D-enantiomorph and the subject D,L-racemate product were identical. The subject product was optically inactive: $[\alpha]_D^{19.7°}$: 0.0° (chloroform; c., 1.06).

0.1 gram sulfuric acid may be substituted for the 0.2 g. p-toluenesulfonic acid in the foregoing example to yield a similar dianhydrization product.

EXAMPLE 6

A mixture of allitol and D,L-mannitol was obtained by fractionating a dulcitol isomerization product as described by Wright and Hartmann (Journal Organic Chemistry 26, 1588, 1961) via their hexaacetates. The mixture obtained consisted of 36% allitol and 64% D,L-mannitol as determined by gas-liquid chromatography. A 2.0 gram sample of the mixture was heated in vacuum (0.75 mm. Hg) in the presence of 2% p-toluenesulfonic acid and a distillate was collected at 125° C.–150° C. A yield of 0.71 gram dianhydrohexitols was obtained. The distillate consisted mainly of 1,4-3,6-dianhydromannitol and 1,4-3,6-dianhydroglucitol. The dianhydroglucitol content of the product by gas-liquid chromatography was 37.4%. Since mannitol yields only 1,4-3,6-dianhydromannitol, it is established the dianhydroglucitol was derived from allitol. The dianhydrohexitol product obtained above was benzoylated and 2,5-dibenzoyl-1,4-3,6-dianhydro-D,L-glucitol, M.P. 125–126.5° C. and 2,5-dibenzoyl-1,4-3,6-dianhydro-D,L-mannitol M.P. 146–148° C. were isolated and identified by infrared spectroscopy.

What is claimed is:

1. A process of preparing dianhydrohexitols which comprises heating a polyol selected from the group consisting of dulcitol, allitol, talitol, and their 1,4-monoanhydrides at a temperature in the range of from about 110° C. to about 185° C. in the presence of an acid catalyst until anhydrized, said talitol and 1,4-monoanhydride of talitol forming 1,4-3,6-dianhydroiditol and said dulcitol, 1,4-monoanhydride of dulcitol, allitol, and 1,4-monoanhydride of allitol forming 1,4-3,6-dianhydroglucitol.

2. The process of claim 1 wherein the polyol D,L-talitol is anhydrized to form 1,4-3,6-dianhydro-D,L-iditol.

3. The process of claim 1 wherein the polyol D-talitol is anhydrized to form 1,4-3,6-dianhydro-D-iditol.

4. The process of claim 1 wherein the polyol L-talitol is anhydrized to form 1,4-3,6-dianhydrol-L-iditol.

5. The process of claim 1 wherein the polyol dulcitol is anhydrized to form 1,4-3,6-dianhydro-D,L-glucitol.

6. The process of claim 1 wherein the polyol allitol is anhydrized to form 1,4-3,6-dianhydro-D,L-glucitol.

7. The process of claim 2 wherein the catalyst is selected from the group consisting of p-toluenesulfonic acid and sulfuric acid.

8. The process of claim 3 wherein the catalyst is selected from the group consisting of p-toluenesulfonic acid and sulfuric acid.

9. The process of claim 4 wherein the catalyst is selected from the group consisting of p-toluenesulfonic acid and sulfuric acid.

10. The process of claim 5 wherein the catalyst is selected from the group consisting of p-toluenesulfonic acid and sulfuric acid.

11. The process of claim 6 wherein the catalyst is selected from the group consisting of p-toluenesulfonic acid and sulfuric acid.

References Cited

FOREIGN PATENTS 600,870    4/1948    Great Britain.

ALEX MAZEL, *Primary Examiner.*

BERNARD I. DENTZ, *Assistant Examiner.*